United States Patent [19]
Kawamura et al.

[11] Patent Number: 5,369,708
[45] Date of Patent: Nov. 29, 1994

[54] FAST SERVER-AIDED COMPUTATION SYSTEM AND METHOD FOR MODULAR EXPONENTIATION WITHOUT REVEALING CLIENT'S SECRET TO AUXILIARY DEVICE

[75] Inventors: Shinichi Kawamura, New York, N.Y.; Atsushi Shimbo, Chiba, Japan

[73] Assignee: Kabushiki Kaisha Toshiba, Kawasaki, Japan

[21] Appl. No.: 40,597

[22] Filed: Mar. 31, 1993

[30] Foreign Application Priority Data

Mar. 31, 1992 [JP] Japan ................... 4-077881

[51] Int. Cl.⁵ ................... H04K 1/00; H04L 9/00
[52] U.S. Cl. ................... 380/30; 380/28; 380/29
[58] Field of Search ................... 380/30, 28, 29

[56] References Cited

U.S. PATENT DOCUMENTS

| | | |
|---|---|---|
| 5,046,094 | 9/1991 | Kawamura et al. |
| 5,077,793 | 12/1991 | Falk et al. ................ 380/28 |
| 5,101,431 | 3/1992 | Even ........................ 380/30 |
| 5,261,001 | 11/1993 | Dariel et al. ............. 380/30 |

OTHER PUBLICATIONS

Siam J. Comput., vol. 5, No. 1, pp. 100–103, Mar. 1976, A.C.–C. Yao, "On The Evaluation of Powers".
Proceeding of Smart Card 2000, Amsterdam 4–6, pp. 191–197, North-Holland, Amsterdam, 1991, D. Chalm, "Speeding Up Smart Card RSA Computations . . .".
Communications of the ACM, vol. 21, No. 2, Feb. 1978, pp. 191–197, S. L. Graham, et al., "A Method for Obtaining Digital Signatures and . . .".
Communications of the ACM, vol. 21, No. 2, Feb. 1978, pp. 120–126, R. L. Rivest et al., "A Method for Obtaining Digital Signatures and . . .".

*Primary Examiner*—David C. Cain
*Attorney, Agent, or Firm*—Oblon, Spivak, McClelland, Maier & Neustadt

[57] ABSTRACT

The most reliable server-aided computation system and method where a client request a server to perform modular exponentiation computation without revealing a cleint's secret to the server. The computation system includes a main device having a modular multiplication processing portion so that at least two integers are multiplied and a result thereof is divided by a modulus so as to obtain a residue thereof, exponent register portion for storing a secret exponent, and memory portion for storing a computed result in the processing portion; an auxiliary device having a modular multiplication processing portion for performing computation requested by the main device and sending back a result thus obtained therefrom to the main device; and communications channel for communicating data between the main device and the auxiliary device, wherein the auxiliary means performs computing steps without involving the secret exponent d which is only known to the main device.

12 Claims, 13 Drawing Sheets

FIG.12

| EMBODI-MENT | NUMBER OF MODULAR MULTIPLICATION | | COMMUNICATIONS TRAFFIC (BLOCK) | MEMORY AMOUNT (BLOCK) | |
|---|---|---|---|---|---|
| | CLIENT | SERVER | | CLIENT | SERVER |
| 1 | $2^{k+1} + \lceil m/k \rceil - 5$ | $k \lceil \lceil m/k \rceil - 1 \rceil$ | $\lceil m/k \rceil - 1$ | $2^k + 3$ | 3 |
| 2 | $2^k + \lceil m/k \rceil - 1$ | $m - 1$ | $m + 1$ | $2^{k-1} + 4$ | 3 |
| 3 | $\lceil m/k \rceil$ | $(k + 2^k - 1) \lceil m/k \rceil - k$ | $(2^k - 1) \lceil m/k \rceil$ | 5 | 4 |
| 4 | (PRE-COMPUTATION 1) + $\lceil m/k \rceil + 1$ | $2^{k+1} + k(\lceil m/k \rceil - 1) - 4$ | $2^k + k(\lceil m/k \rceil + 1)$ | $2^{k+1} + 3$ | $2^k$ |
| 5 | (PRE-COMPUTATION 2) + $\lceil m/k \rceil$ | $2^k + m - 1$ | $2^{k-1} + m + 2$ | $2^k + 5$ | $2^{k-1} + 2$ |
| 6 | $\ell + 2[b/3] - 3$ | $2\ell + (\ell - 1) \cdot \text{Exp}(b) + \ell \cdot \text{Inv}$ | $4\ell + 1$ | $[b/3] + 2$ | 5 |
| 7 | (PRE-COMPUTATION 3) + $\ell + 1$ | $2(\ell + [b/3] - 1) + (\ell - 1) \cdot \text{Exp}(b) + \ell \cdot \text{Inv}$ | $4\ell + [b/3] + 3$ | $2[b/3] + 3$ | $[b/3] + 5$ |

FIG.13

| EMBODI-MENT | NUMBER OF MODULAR MULTIPLICATION | | COMMUNICATIONS TRAFFIC (BLOCK) | MEMORY AMOUNT (BLOCK) | |
|---|---|---|---|---|---|
| | CLIENT | SERVER | | CLIENT | SERVER |
| 1 | 162 | 510 | 104 | 36 | 2 |
| 2 | 134 | 511 | 513 | 20 | 2 |
| 3 | 103 | 3703 | 3193 | 5 | 4 |
| 4 | (PRE-COMPUTATION 1) + 104 | 570 | 136 | 67 | 32 |
| 5 | (PRE-COMPUTATION 2) + 104 | 134 | 530 | 37 | 18 |
| 6 | 121 | 1830 | 409 | 13 | 5 |
| 7 | (PRE-COMPUTATION 3) + 103 | 1850 | 422 | 25 | 16 |

FAST SERVER-AIDED COMPUTATION SYSTEM AND METHOD FOR MODULAR EXPONENTIATION WITHOUT REVEALING CLIENT'S SECRET TO AUXILIARY DEVICE

BACKGROUND OF THE INVENTION

1. Field of the Invention

The present invention relates to a highly safe server-aided computation system and method where a client requests a server to perform an arithmetic operation which does not depend on the client's secret.

2. Description of the Prior Art

In general, a public key cryptosystem is actively under investigation in order to obtain security of a communication information processing. The many public key cryptosystems such as an RSA system performs the following basic operation of modular exponentiation:

$$C = M^d \bmod n \qquad (1)$$

where M denotes a plain text and d a secret exponent. The RSA system is called as such after the initials of the last names of three inventors thereof, Rivest, Shamir and Adleman. Here, in order to secure the cryptosystem, a large number such as one with 512 bits length or more is generally used for each variable C, M, n and d. Therefore, steps for processing are significantly long, and when the arithmetic operations necessary for the steps is to be carried out by a system having a relatively slow processing speed, it takes a very long time to complete the operation.

Moreover, in the course of decoding the RSA cryptosystem, the exponent d must be kept secret in equation (1), so that care must be taken in dealing with the exponent when arithmetic operation is performed. It is convenient and safe on carriage that the d or n which serves as a key for decryption is stored in storage media such as an IC card or the like. However, in a case where an other system other than the IC card performs the exponentiation, the keys d and n must be sent to a system in which the modular exponentiation is operated, thus causing a possibility that the secret exponent d may be revealed to a third party. Moreover, though the modular exponentiation may be operated by a CPU (central processing unit) equipped in the IC card, it is difficult to achieve a practically fast processing time by the CPU equipped with the IC card since a capacity for numeric calculation in the IC card's CPU is very limited.

Therefore, conventionally proposed is that an auxiliary system is assigned for performing fast processing and keeping a secrecy on the exponent. This is called a server-aided secret computation method. Generally, the server-aided secret computation is executed by a system comprising three portions that are a client, a server and a communication line connecting the client and and the server. Among the calculation system, the client is a system which has a secret information regarding an object processing and is inferior to the server in the capacity of the arithmetic operation. The server executes a processing content requested by the client and sends back a result thereof to the client through the communication line. In the above processing, the server-aided secret computation method is such that a whole processing time is reduced by means of an auxiliary help from the server without revealing the secret information of the client to the third party. When the server-aided secret computation is configured using decryption system of the RSA cryptography, the exponent d in equation (1) is the secret information of the client.

As examples of the conventional server-aided computation protocols, there is a method proposed by Matsumoto et. al. ("Speeding up secret computation with insecure auxiliary devices", Proc. of Crypto 1988, Springer Lecture Notes in Computer Science, 408, pp. 497-506, 1988), and there is another revised and variation version by C. S. Laih et. al. (C. S. Laih et. al., "Two efficient server-aided secret computation protocols", proceeding of ASIACRYPT 1991). However, security of their protocols suggested by Matsumoto et. al. and Laih et. al. is unclear since transmitted messages between the client and the server are not perfectly independent of the secret exponent In order to possibly prevent the drawbacks in the above two examples, there is a method propose by Quisquater et. al. where the server's processing is made independent of the secret exponent (d) (J. J. Quisquater et. al. "Speeding up smart card RSA computations with insecure coprocessors", Smart Card 2000, Amsterdam 4-6, pp. 191-197, North Holland, Amsterdam, 1991). However, the method by Quisquater et. al. necessitates a huge volume of processing and communication in the client and the server, and there has been waited a further efficient technique to date.

As for a method where a modular exponentiation is realized with less number of modular multiplications there have been suggested various methods therefor. However, these methods differ in the server-aided secret computation in that the modular exponentiation is executed by both server and client and the object of these conventional methods do not lie in the fact that the exponent is revealed to no one but the client. Therefore, such conventional methods can not be applied to fulfill the objective of the server-aided computation.

Accordingly, in the conventional protocols such as one suggested by Matsumoto et. al., the security of the protocols is doubtful so that there is strong possibility that secret key might be revealed to the third party. Moreover, in the method employed by Quisquater et. al., there is far too much processing amount so that there is needed a much longer time for completing the arithmetic operation.

SUMMARY OF THE INVENTION

In view of the foregoing drawbacks, an object of the present invention is to provide a server-aided computation system and method capable of securing high safety and of reducing a time necessary for an arithmetic operation. Therefor, for an aspect of the object, there is provided an auxiliary device aided computation system comprising: a main device including a modular multiplication processing portion so that at least two integers are multiplied and a result thereof is divided by a modulus so as to obtain a residue thereof, exponent register means for storing a secret exponent, and memory means for storing a computed result in the processing portion; an auxiliary means including a modular multiplication processing portion for performing computation requested by the main device and sending back a result thus obtained therefrom to the main device; and communications means for communicating data between the main device and the auxiliary means, wherein the auxiliary means performs computing steps without involving the secret exponent d which is only known to the main device.

For another aspect of the object, there is offered a method of computing $C = M^d \mod n$ by a main device assisted by an auxiliary computation device, where M and n are positive integers, without revealing d to the auxiliary device, comprising the steps of: defining $$d = \sum_{j=0}^{l-1} d_j \cdot 2^{kj}$$

where $0 \geq d_j \geq 2^k - 1 m \, k < 1$, l is a least integer greater or equal to m/k where m is a bit number of exponent d, and storing $d_j$ (j=0, 1, 2, ..., l−1) by the main device; sending M and n from the main device to the auxiliary device; computing by the auxiliary device $M^{\wedge}2^{kj} \mod n$ for every J=0, 1, 2, ..., l−1 and sending a computational result thereof to the main device; and computing by the main device a desired value $M^d$ from a plurality of the above computational results and $d_j$ and j=0, 1, 2, ..., l−1.

Other features and advantages of the present invention will become apparent from the following description taken in conjunction with the accompanying drawings.

BRIEF DESCRIPTION OF THE DRAWINGS

FIG. 12 shows a table showing comparison charts indicate characteristics for different techniques.

FIG. 13 shows detailed performance analysis for each technique shown in FIG. 10 on the condition that the bit number of the modulus n is 512 bits.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

Figure 2:
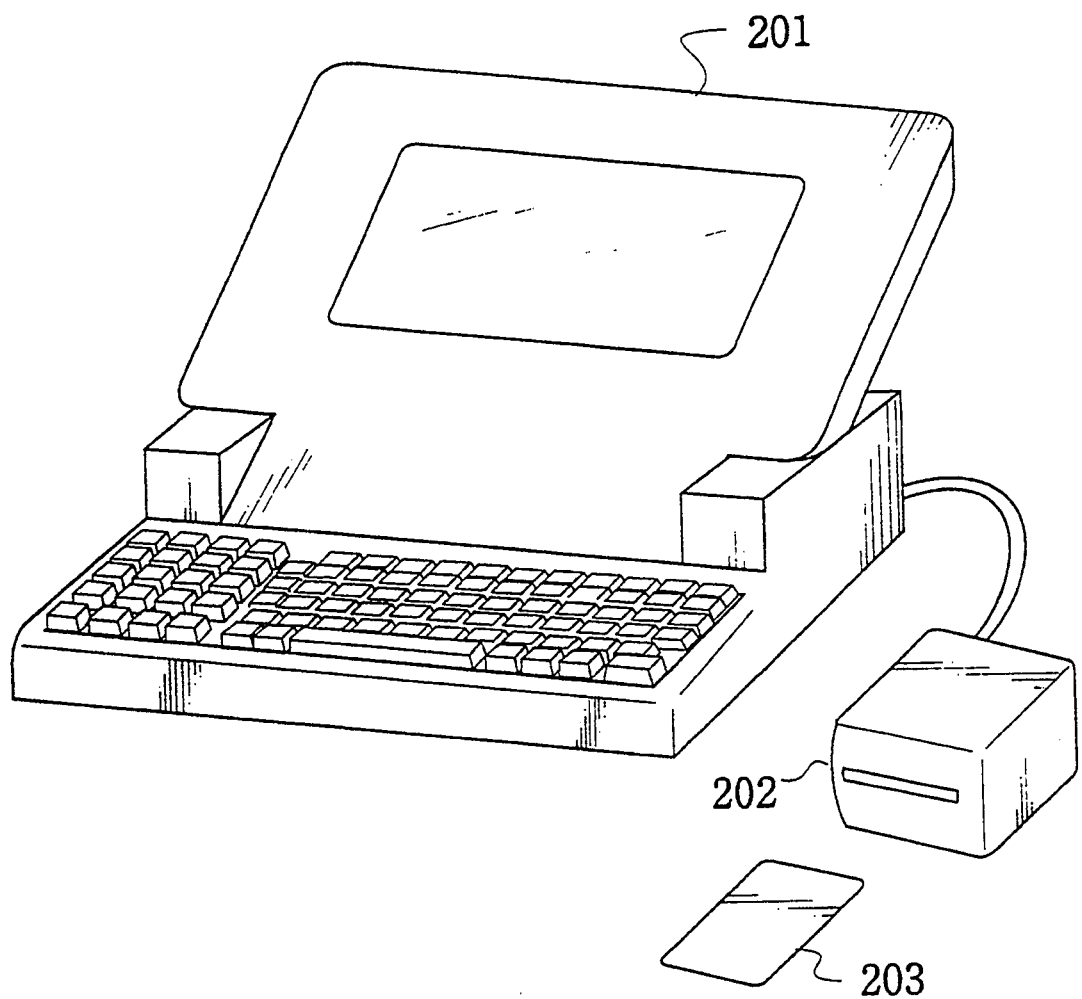
FIG. 2 shows a typical hardware configuration using an IC card system.

Before describing operational sequences, an example of an IC card system is taken here to describe an basic embodiment for the present invention, and with reference to FIG. 2, a typical hardware configuration therefor is described.

In FIG. 2, an IC card is a plastic card, with an approximated size of a calling card, which comprises a CPU and an external communication terminal for communicating with other portions of the IC card. A secret exponent d and modulus n are recorded in a memory of the IC card 203. In particular, an access to the IC card 203 is controlled so that the secret exponent d can not be revealed externally.

The IC card 203 is connected to a terminal 201 through a reader/writer 202 which is an interface device for reading and writing data. In the terminal 201, there is equipped a CPU whose computing capacity is high and which assists modular exponentiation. The IC card 203 corresponds to a client, whereas the terminal corresponds to a server. The others, including the reader/writer 202, correspond to a communication line.

Figure 1:
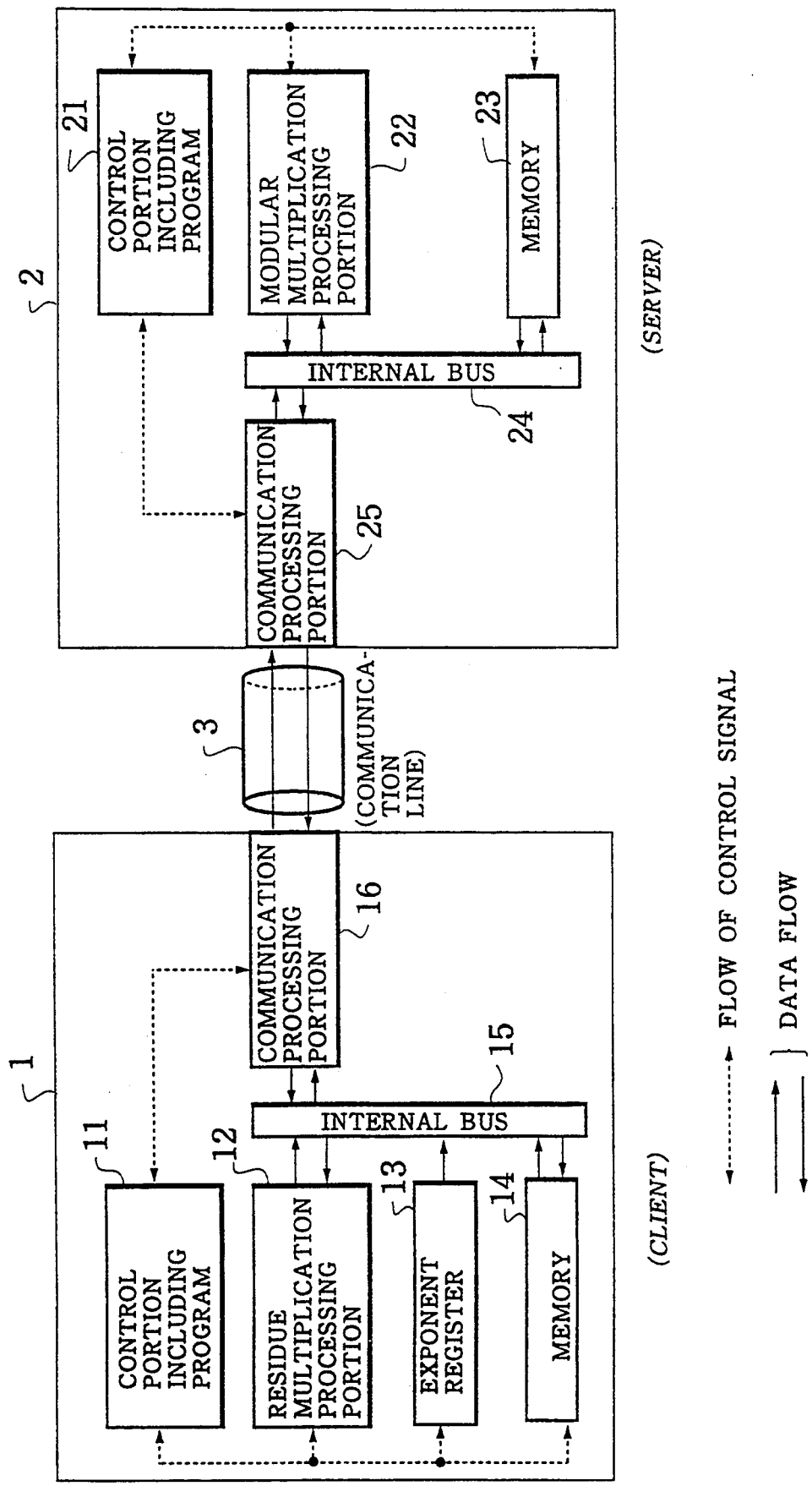
FIG. 1 shows a block diagram showing a typical configuration of the server-aided computation system according to the present invention.

FIG. 1 shows a block diagram showing a typical configuration of the server-aided computation system according to the present invention. The configuration shown in FIG. 1 is not necessarily limited to an IC card system alone. As a typical functional block of the client 1, there are provided a control portion 11 for controlling an operation of the client 1, a modular multiplication processing portion 12 where two Integers are multiplied and the result thereof is divided by a modulus so as to obtain a residue thereof, an exponent register 13 for storing a secret exponent, a memory for storing in-process result, a communication processing portion 16 for communicating with an external portion, and an internal bus by which a dispatch and receive of such data between the client and the server is realized. The client 1 can communicate data with the server through the communication line 3. As a typical functional block of the server, there are provided a control portion 21, modular multiplication processing portion 22, a memory 23, an internal bus, and a communication processing portion 25. In general, a capacity for processing the modular exponentiation in the server is far greater than that of the client. Thus, the amount of operation burdened onto the client is significantly reduced.

EMBODIMENT NO. 1

Figure 3:
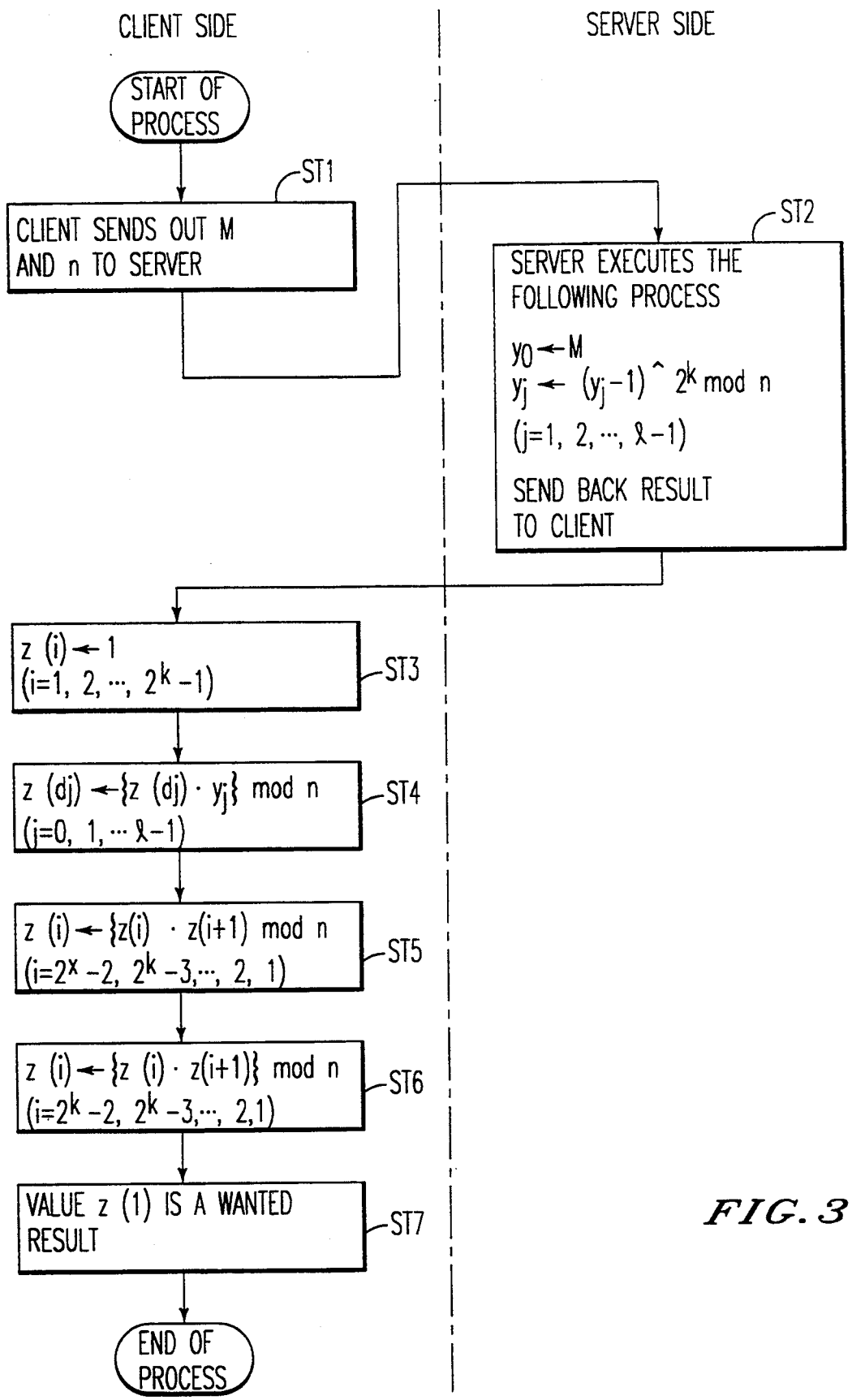
FIG. 3 is a flowchart showing an operation of the first embodiment.

Next, with reference to FIG. 3, the first embodiment of the present invention is described using a flowchart shown therein. The object of client's processing is to obtain $C = M^d \mod n$ while keeping the secrecy of the exponent d, where M is a plain text, and M and n are positive integers. In flowcharts shown in FIG. 3 through FIG. 9, a right side portion in each figure divided by a broken line in the center Indicates a processing by the server, while a left side portion thereof indicates a processing carried by the client.

With reference to the following equation (2), client stores data as a divided block for every k bit. Then, l is the minimum integer greater than or equal to m/k. Let the bit number of modulus n be m, the bit number of d is usually around m.

$$d = \sum_{j=0}^{l-1} d_j \cdot 2^{kj} \qquad (2)$$

$0 \leq d_j \leq 2^k - 1$. Then, the exponent d is held secret except to the client. In the description to follow, "a←b" means that variable a is substituted for value b. The client and the server proceed to process in the following steps.

Step ST1: The client sends M and n to the server.

Step ST2: The server executes the following processes (a) through (c):
 (a): Initialization
  $y_0 \leftarrow M$
 (b): For each subscript $j=1, 2, \ldots, 1-1$, value, compute the modular exponentiation
  $y_j \leftarrow (y_{j-1}{}^{\wedge}2^k)$ mod n, where $a^{\wedge}b$ represents a to the power of b, that is, $a^b$.
 (c): Send $y_1, y_2, \ldots, y_{1-1}$ to the client.

Next, the client accumulates $y_j$ ($j=1, 2, \ldots, 1-1$) successively sent from the server to memory $z(i)$ in the following rule.

Step ST3: For $i=1, 2, \ldots, 2^k-1$, initialize memory $z(i)$ as follows.
 $z(i) \leftarrow 1$ Step ST4: for $j=0, 1, 2, \ldots, 1-1$, multiply $y_j$ to $z(i)$ as
 $z(d_j) \leftarrow \{z(d_j).y_j\}$ mod n
where $y_0 = M$. If $d_j = 0$, multiplication is not necessary.

Then the client undergoes the following process.

Step ST5: For $1=2^k-2, 2^j-3, \ldots, 2, 1$ in this order, compute
 $z(i) \leftarrow \{z(i).z(i+1)\}$ mod n Step ST6: Repeat Step ST5.

Step ST7: A content of memory $z(1)$ is a wanted result. The following describes how ($C = M^d$ mod n) is obtained at $z(1)$ by the above procedures.

Base bit is defined as $b = 2^k$, then d is represented as $$d = \sum_{i=0}^{l-1} d_i \cdot b^i$$

where $0 \le d_1 \le b-1$, and $1 = \lceil m/k \rceil$ where $\lceil x \rceil$ represents the Minimum integer equal to or greater than x. By defining set $S(j) = \{i | d_i = j\}$, d is rewritten as, $$d = \sum_{j=1}^{b-1} \{j \cdot (\Sigma\, b^i)\}$$
$i$ belongs to $S(j)$ Thus the following equation holds:

$$M^d \bmod n = \prod_{j=1}^{b-1} (\Pi\, M \leftarrow b^i)^j \bmod n$$
$i$ belongs to $S(j)$
$$= \prod_{j=1}^{b-1} z(j)^j \bmod n$$

where $z(j) = \Pi\, M^{\wedge}b^i \bmod n.$
$i$ belongs to $S(j)$

Using these representations, the modular exponentiation is described as follows:

First, $M^{\wedge}b^i$ mod n is computed for $i=1, 2, \ldots, 1-1$, which corresponds to step ST2. Then, $z(j)$ is computed for $j=1, 2, \ldots, b-1$, which corresponds to steps ST3 through ST4. Finally, $M^d$ mod n is obtained by computing $$\prod_{j=1}^{b-1} z(j)^j \bmod n,$$

which corresponds to steps ST5 through ST7.

Therefore, the client can obtain the intended computational results by following the above procedures.

It is to be noted here that other steps may be perfomed instead of above steps from ST3 through ST7 so as to obtain the same result therefrom.

The performance for the server-aided computation executed above will be described below.

With regard to secrecy of the exponent, by employing the above procedures, the information transmitted through the communication line and the processes executed at the server do not depend on the value of the exponent d. Therefore, information on d is not revealed to any third party other than the client.

With regard to the amount of processing by the server, the most time-consuming portion is usually a modular exponentiation operation in step ST2 (b). There is needed the number of $k(\lceil m/k \rceil - 1)$ modular multiplications in the step ST2 (b), where $\lceil x \rceil$ represents the minimum integer greater than or equal to x.

As for the amount to be executed by the client, the most time-consuming parts among the client's processes Is the modular exponentiation operation in steps ST4, ST5 and ST6. The number of the modular multiplications necessary for these steps is $(2^{k+1}+1-5)$.

As for the amount of communication required, when messages transmitted by the server and the client are counted by a unit comprising m-bit block, summation of communications in steps ST1 and step ST2 (2) is $(1+1)$ blocks.

As for the amount of memory, when the memory amount related to the operation is estimated by a unit of m-bit block, the server has three blocks of $y_1$, M and n whereas the client has $(2^k + 3)$ blocks comprising M, $y_j$, $Z(i)$ ($i=1, 2, \ldots, 2^k-1$), n and d.

Figure 11:
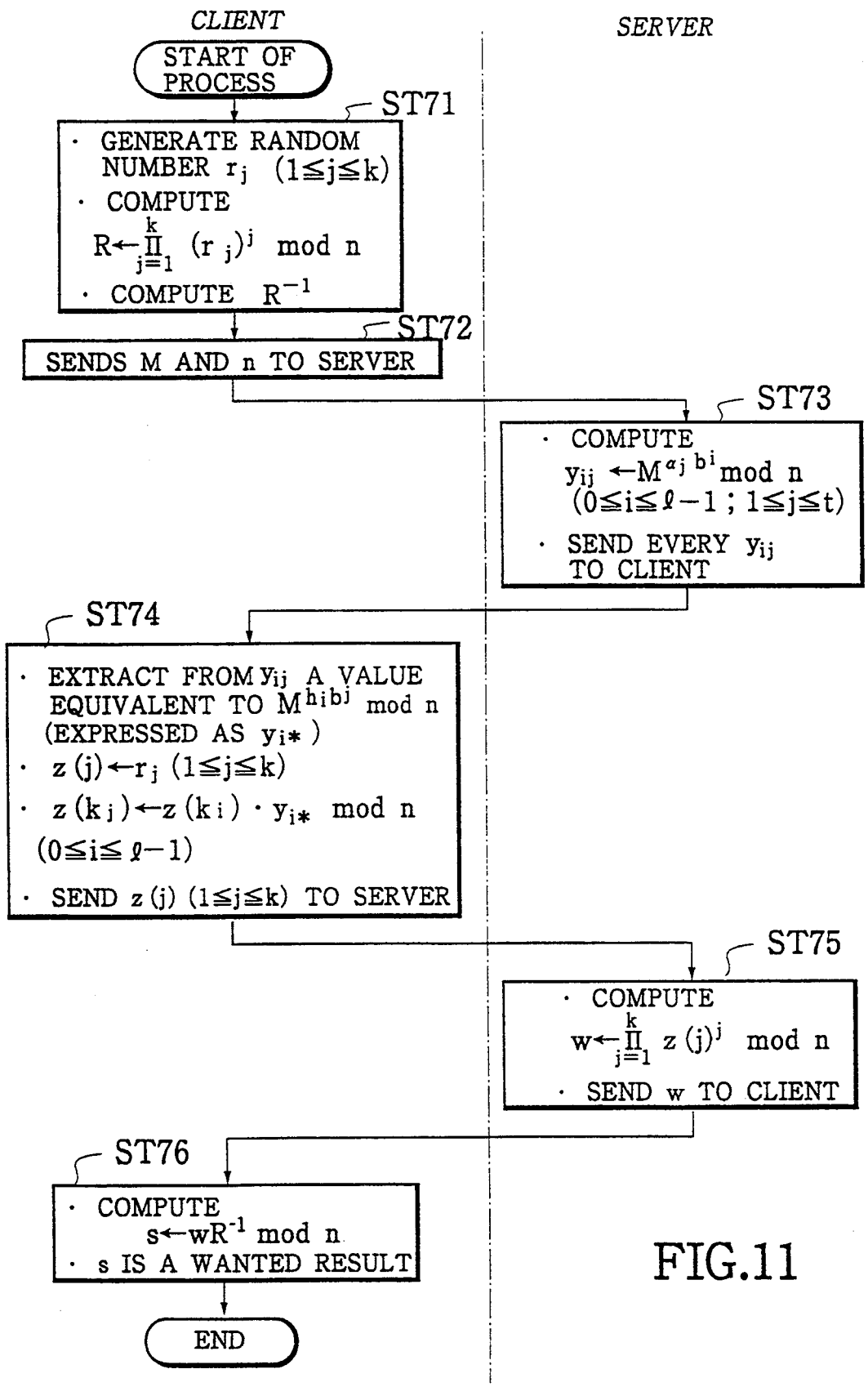
FIG. 11 is a flowchart showing an operation of the seventh embodiment.

With reference to FIG. 12, there is provided a table showing comparison charts to indicate characteristics for other different techniques. Since the typical bit number of modulus n used for a cryptosystem is 512 bits, FIG. 11 shows detailed characteristics for each technique on the condition that the bit number of the modulus n is 512 bits.

Now, in case where the modular exponentiation of RSA cryptosystem is operated, the modulus n is a product of two prime numbers p, q each of which has approximately half of number of digits of n, and the prime numbers p, q are usually known to the client. According to the number theory, the modular multiplication operation with modulus n is also realized by that the modular multiplication operation is performed each on modulus p and q and then composite operation therefor is performed using a Chinese remainder theorem. By utilizing this technique, the modular multiplication carried out by the client can be divided into the modular multiplications performed on modulus p and q. An advantage for this technique is that since the exponent length of each modulus p and q is shortened to its half compared to the modulus n, the number of $y_j$'s in which the server sends to the client is reduced by a half amount compared to the number in the above first embodiment. Therefore, the reduction of the communication amount and operational volumes is realized. In the following embodiments, the same advantage as in the first embodiment will be applied so as to reduce the amount off communication and operational volumes to be performed.

EMBODIMENT NO. 2

Figure 4:
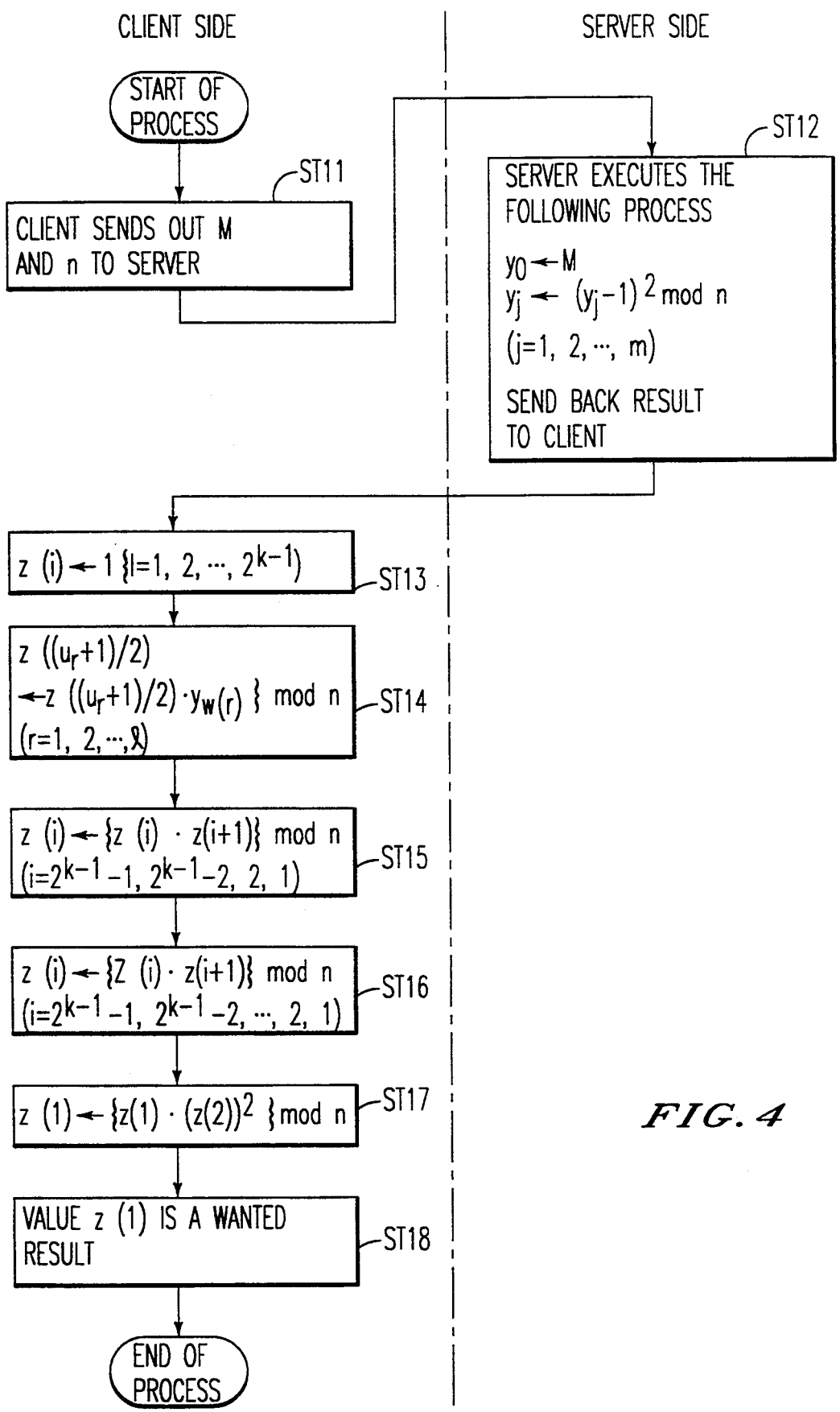
FIG. 4 is a flowchart showing an operation of the second embodiment.

With reference to FIG. 4, the second embodiment according to the present invention will be described. Suppose that the exponent d is binary number of m bits. Then, by taking the following procedure, a block up whose predetermined block length is k-bit long is windowed so as to be stored by the client alone.

The process of windowing the block will be described as follows. The exponent d expressed by the binary number is scanned from the least significant bit to the most significant bit so that the scanning continues until the bit "1" appears. When the bit "1" appears, successive k bit including the bit "1" is windowed as a first block $u_i$ and the bit "1"'s position is defined as $w(1)$. After repeating the same procedure up to the most significant bit, d is represented as $$d = \sum_{r=1}^{l} u_r \cdot 2^{w(r)} \qquad (6)$$

where $1 \leq u_r \leq 2^k - 1$ and $u_r$ is an odd number. With the above preparation, a server-aided computation procedure takes place as follows. In contrast to the first embodiment, l is determined depending on a bit pattern of d. The maximum value of l is the least integer which is greater than or equal to m/k.

Step ST11: The client sends M and n to the server.
Step ST12: The server executes the following processes (a) through (c).
  (a): Initialization
    $y_0 \leftarrow M$
  (b) For each subscript $J=1, 2, \ldots, m$, compute and repeat squaring operation
    $y_j \leftarrow y_{j-1}^{\wedge}2 \mod n$
  (c) Send $y_1, y_2, \ldots, y_m$ to the client.

Next, the client selects $y_j$ which corresponds to $M^{\wedge}2^{w(r)}$, denoted by $y_{w(r)}$ ($r=1, 2, \ldots, 1$) among $y_j$ ($j=1, 2, \ldots, m$) successively sent from the server and accumulates yJ to memory $z(i)$ ($i=1, 2, \ldots, 2^{k-1}$) in the following manner. Here, assume that $y_0 = M$.

Step ST13: For $1=1, 2, \ldots, 1$, accumulate to multiply $y_{w(r)}$ to $z(i)$ as
  $a((u_r+1)/2) \leftarrow \{z((u_r+1)/2) \cdot y_{w(r)}\} \mod n$
Then, the client executes the following procedures.
Step ST15 : For subscripts $i=2^{k-1}-1, 2^{k-1}-2, \ldots, 2, 1$ in this order, compute
  $z(i) \leftarrow z(i) \cdot z(i.30\ 1)\} \mod n$
Step ST16: Repeat step ST15 for subscripts $i=2^{(k-1)}-1, 2^{(k-1)}-2, \ldots, 2$.
Step ST17: $z(1) \leftarrow \{z(1) \cdot (z(2))^2\} \mod n$.
Step ST18: A content of memory $z(1)$ is the wanted result.

By taking the above steps, there is obtained $C = M^d \mod n$ as explained in the first embodiment. It is to be noted that in this second embodiment when the same k as in the first embodiment is used the number of memory $z(i)$ required in this second embodiment is half of that required in the first embodiment. This is because steps ST15 through ST18 are executed utilizing the fact that $u_r$ which breaks down the exponent are all odd numbers. Moreover, the second embodiment differs from the first embodiment in that the number of computation through steps ST15 through ST18 is approximately half of that in the first embodiment. The performance of the second embodiment is also indicated in FIG. 13 and FIG. 13 so as to be compared to other embodiments.

EMBODIMENT NO. 3

Figure 5:
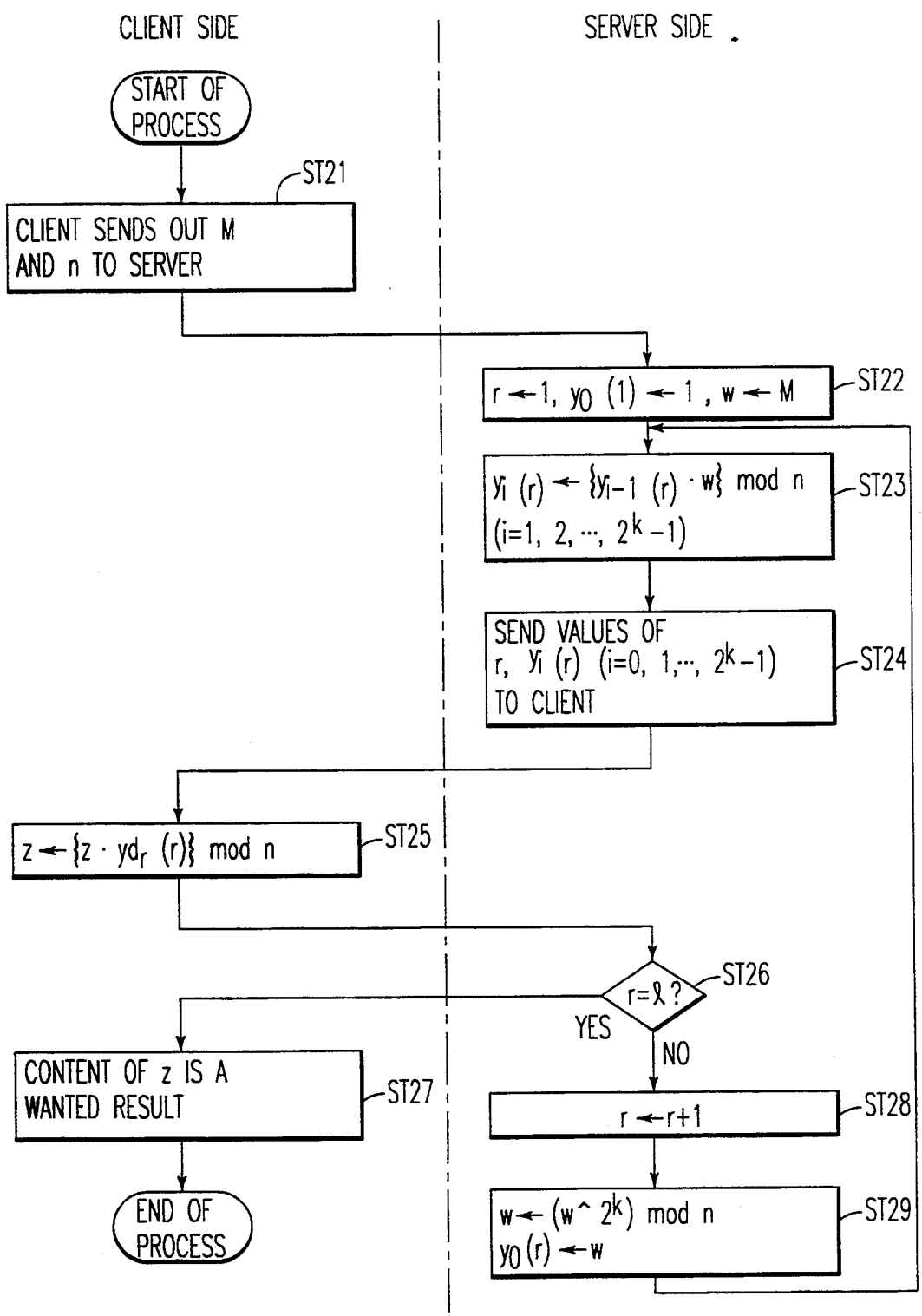
FIG. 5 is a flowchart showing an operation of tile third embodiment.

With reference to FIG. 5, the third embodiment is described using a flowchart shown therein. Similar to the first embodiment, the exponent d is divided as a block $d_j$ in a unit of k bits and each value of the block is known by the client alone.

Step ST21: The client sends M and N to the server.
The server executes the following processes
Step ST22: Initialization
  $r \leftarrow 1$, $y_0(1) \leftarrow 1$, $w \leftarrow M$
Step ST23: For $1=1, 2, \ldots, 2^k - 1$, compute modular multiplication
  $y_i(r) \leftarrow \{y_{i-1}(r) \cdot w\} \mod n$
Step ST 24: Send values of $r_j$ $y_1(r)$, $y_2(r)$, ..., $y(2^k-1)(r)$ to the client, where yx represents that x is a subscript of y.
Step ST26: If $r=1$, terminate the procedure.
Step ST28: $r \leftarrow r+1$
Step ST29: Reset $y_o(r)$ in the following manner and return to Step ST23.
  $w \leftarrow (w^{\wedge}2^k) \mod n$
  $y_o(r) \leftarrow w$
Then, the client undergoes the following process
Step ST25: The client accumulates $y_i(r)$, $i=0, 1, 2, \ldots, 2^k - 1m$ which is sent from the server at Step ST24, to memory z as below.
  $z \leftarrow \{z \cdot y_{dr(r)}\} \mod n$ (where subscript dr(r) should read as $d_r(r)$) If $d_r = 0$, multiplication is not necessary.
Step ST26: If $r=1$, process to Step ST27.
Step ST27: A content of memory z is a wanted result.
It is obvious that by taking the above steps there is obtained $C = M^d \mod n$.

EMBODIMENT NO. 4

Figure 6:
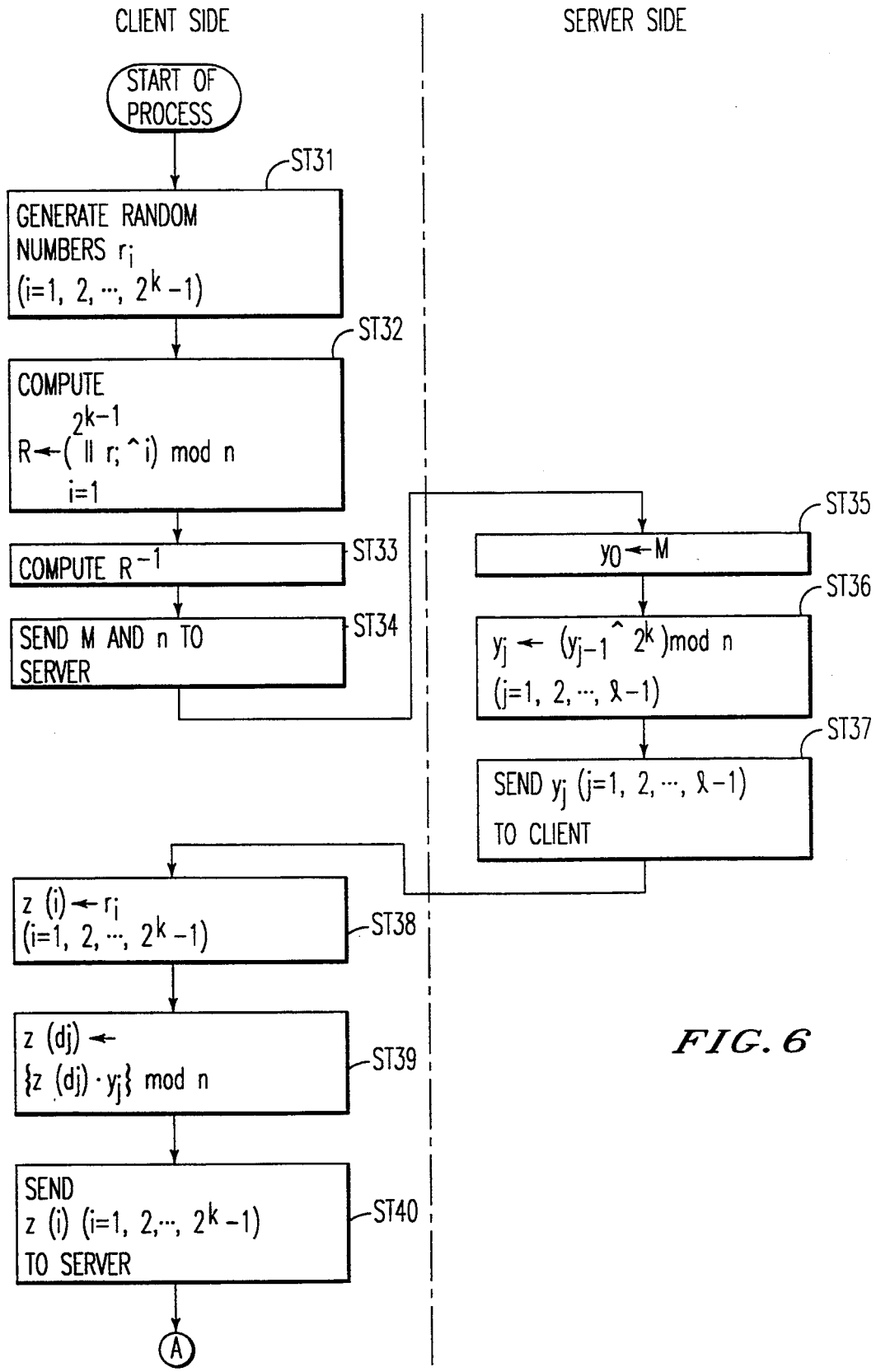
FIG. 6 is the first half of flowchart showing an operation of the fourth embodiment.
Figure 7:
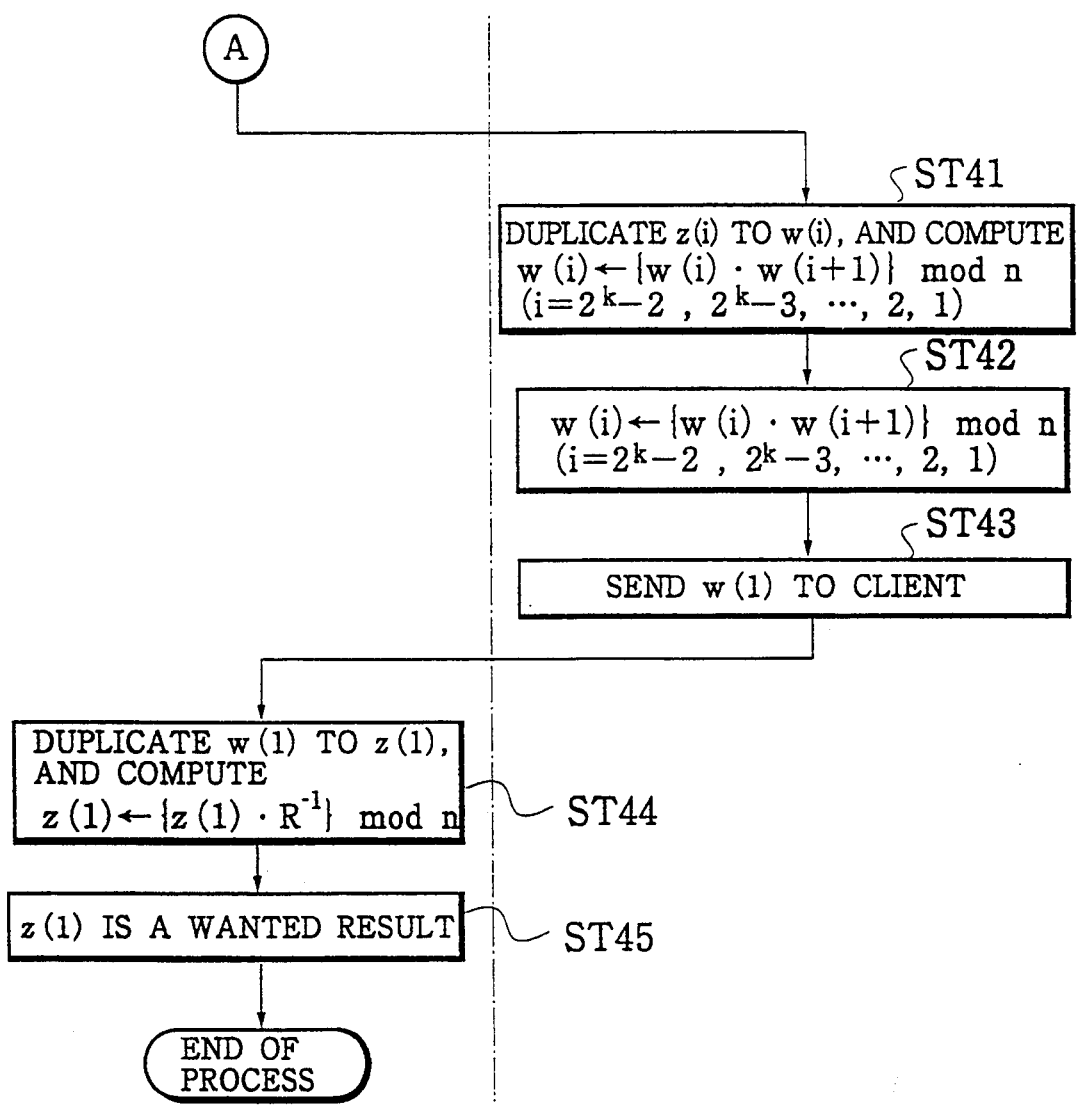
FIG. 7 is the last half of flowchart showing the operation shown in FIG. 6.

With reference to FIG. 6 and FIG. 7, the fourth embodiment will be described. Suppose that, in a similar manner to the first embodiment, the exponent d is divided as a block in a unit of k bits and is stored in the client.

Prior to the modular exponentiation operation, the client performs the following pre-computation of steps ST31 through ST33.

Step ST31: Generate random numbers $r_i$ ($i=1, 2, \ldots, 2^k - 1$) less than n, in number of $(2^k - 1)$.

$$R = \left( \prod_{i=1}^{2^k-1} r_i^{\wedge}i \right) \mod n \qquad (7)$$

Step ST33: Compute $R^{-1}$ which is a reciprocal such that Z
$(R \cdot R^{-1}) \mod n = 1$ \qquad (8)
Step ST34: The client sends M and n to the server.
Then the server executes the following process.
Step ST35: Initialization
  $y_o \leftarrow M$
Step ST36: Compute the modular exponentiation on $Y_j$ for $j=1, 2, \ldots, 1-1$.
  $Y_j \leftarrow (y_{j-1}^{\wedge}2^k) \mod n$
Step ST37: Send $y_1, y_2, \ldots, y_{1-1}$ to the client.

Next, the client accumulates Ya. (j=1, 2, ..., $2^k-1$), which is successively sent from the server to memory z(i), (i=1, 2, ..., $2^k-1$), as below. If $d_r=0$, multiplication is not necessary.

Step ST38: for i=1, 2, ..., $2^k-1$, initialize z(i).
z(i)←$r_i$

Step ST39: For i=0, 2, ..., $2^k-1$, accumulate to multiply z($d_j$).
z($d_j$)←{z($d_j$).$y_j$} mod n Step ST40: Send z(1) (i=1, 2, ..., $2^k-1$) to the server.

Thereafter, the server stores a value of z(i) sent from the client, to w(i) and computes as follows.

Step ST41: For subscripts i=$2^k-2$, $2^k-3$, ... 2, 1 in this order, compute
w(i)←{w(i).w(i+1)} mod n Step ST42: Repeat the step ST41.

Step ST43: Send the value of w(1) to the client.

Step ST44: The client stores the value of w(1) which is received from the server, into z(1), and compute
z(1)←{z(1).$R^{-1}$} mod n so that a final result is obtained at z(1) (Step ST45).

The fourth embodiment is based on the principle of the first embodiment. The difference therebetween lies in that the steps ST5 and ST6 which is executed by the client in the first embodiment is performed by steps ST41 through ST43 which is executed by the server in the fourth embodiment. It is to be noted here that in the fourth embodiment the random numbers are introduced in the initialization of step ST38 so that z(i) does not leak the secret exponent. Moreover, by the stage of completion of step ST43, the value received by the client is one in which R times the final result. In order to adjust such an added extra computation, reciprocal $R^{-1}$ is multiplied to the received value at step ST44. However, since the reciprocal $R^{-1}$ is already computed in step ST33, the process of step ST44 can be completed by one computation of modular multiplication.

Moreover, the steps ST31 through ST33 can be executed prior to determination of M in the fourth embodiment, so that these steps can be carried out preliminarily using an idle time of the client's CPU. Thus, comparing the first embodiment with the fourth embodiment in terms of the number of multiplication executed by the client after the step ST34 which can not be done during the pre-computation, the amount of necessary computation is reduced in the fourth embodiment. The fourth embodiment can further reduce the processing time over the first embodiment under assumption that the communication is not considered and the server is sufficiently high speed type.

EMBODIMENT NO. 5

Figure 8:
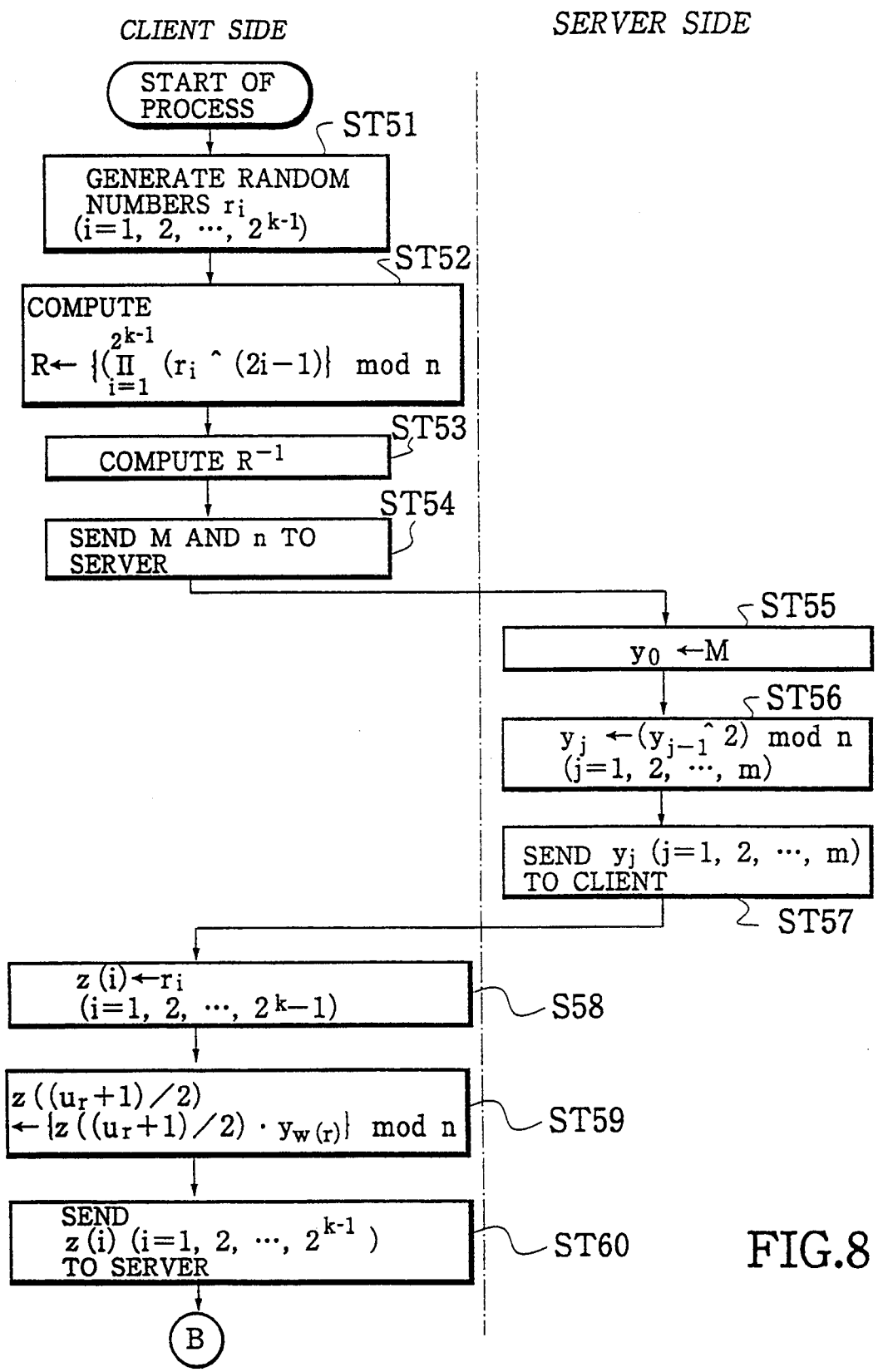
FIG. 8 is the first half of flowchart showing an operation of the fifth embodiment.
Figure 9:
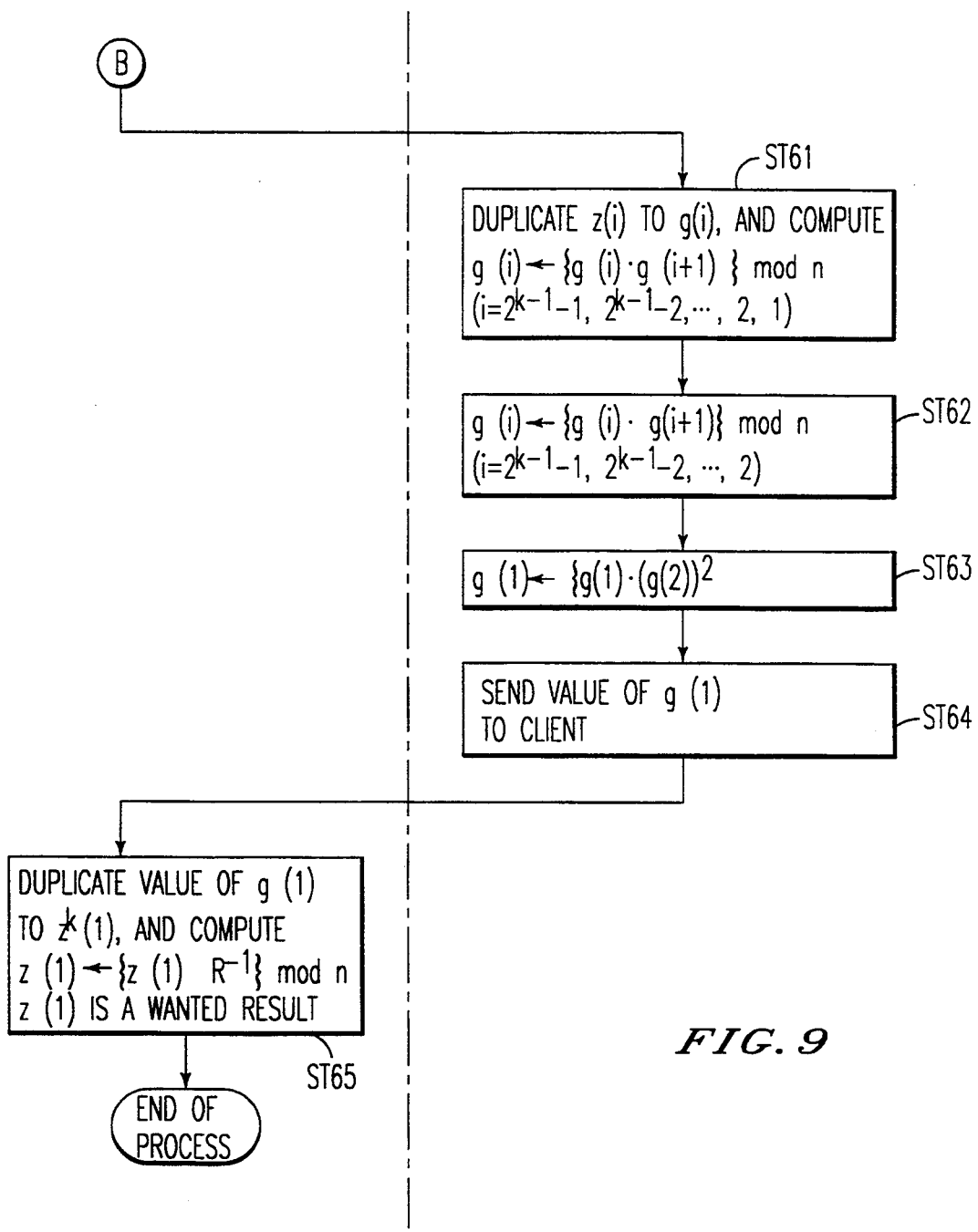
FIG. 9 is the last half of flowchart showing the operation shown in FIG. 8.

With reference to FIG. 8 and FIG. 9, the fifth embodiment will be described. This fifth embodiment is based on the second embodiment, and a similar modification to the fourth embodiment is incorporated in the fifth embodiment. The technique employed by the fifth embodiment is such that the amount of required computation is the least among the last four embodiments. It is to be noted that the computational amount required in steps ST51 through ST53 is excluded in the course of comparing.

Similar to the second embodiment, a block up whose predetermined block length is k-bit long is windowed so as to be stored by the client alone.

Prior to the modular exponentiation operation, the client performs the following pre-computation of steps ST51 through ST53.

Step ST51: Generate random numbers $r_i$ (i=1, 2, ..., $2^{k-1}$) in number of $2^{k-1}$.

$$R = \left( \prod_{i=1}^{2^k-1} r_i^{\wedge}(2i-1) \right) \bmod n \qquad (9)$$

Step ST53: Compute $R^{-1}$ which is a reciprocal such that
(r.$R^{-1}$) mod n=1

Step ST54: The client sends M and n to the server. Then the server executes the following process.

Step ST55: Initialization
$y_0$←M

Step ST56: Repeat squaring computation on $y_j$ for j=1, 2, ..., m.
$y_j$←($y_{j-1}$—2) mod n Step ST57: Send $y_1, y_2, ..., y_m$ to the client.

Next, the client accumulates $y_j$, (j=1, 2, ..., m), which is successively sent from the server and has a subscript w(r) (r=1, 2, ..., ) to memory z(i), i=1, 2, ..., $2^{k-1}$, as below. Here, $y_0$=M.

Step ST58: For i=1, 2, ..., $2^{k-1}$, initialize z(i).
z(i)←$r_i$

Step ST59: For j=1, 2, ..., 1, accumulate to multiply z.
z(($u_r$+1)/2)←{z(($u_r$+1)/2).$y_{w(r)}$} mod n Step ST60: Send z(i) (i=1, 2, ..., $2^{k-1}$) to the server.

Thereafter, the server stores a value of z(1) sent from the client, to memory g(i), i=1, 2, ..., $2^{k-1}$, and computes as follows.

Step ST61: For subscripts i=$2^{k-1}-1$, $2^{k-1}-2$, ... 2, 1 in this order, compute
g(i)←{g(i).g(i+1)} mod n Step ST62: Repeat the step ST61 for subscripts i=$2^{k-1}1$, $2^{k-1}2$, ..., 2 in this order.

Step ST63: g(1)←{g(1).g(2)$^2$} mod n

Step ST64: Send the value of g(1) to the client.

Step ST65: The client duplicates the value of g(1) which is received from the server, into z(1), and compute
z(1)←{z(1).$R^{-1}$} mod n
so that a final result is obtained at z(1).

It is to be noted here against that in the above embodiments each operation executed by the client and the server is not limited to the exactly identical procedures described above, there may exist any other various types of execution steps that can be executed otherwise in order to bring about the same result obtained in the above embodiments.

EMBODIMENT NO. 6

Figure 10:
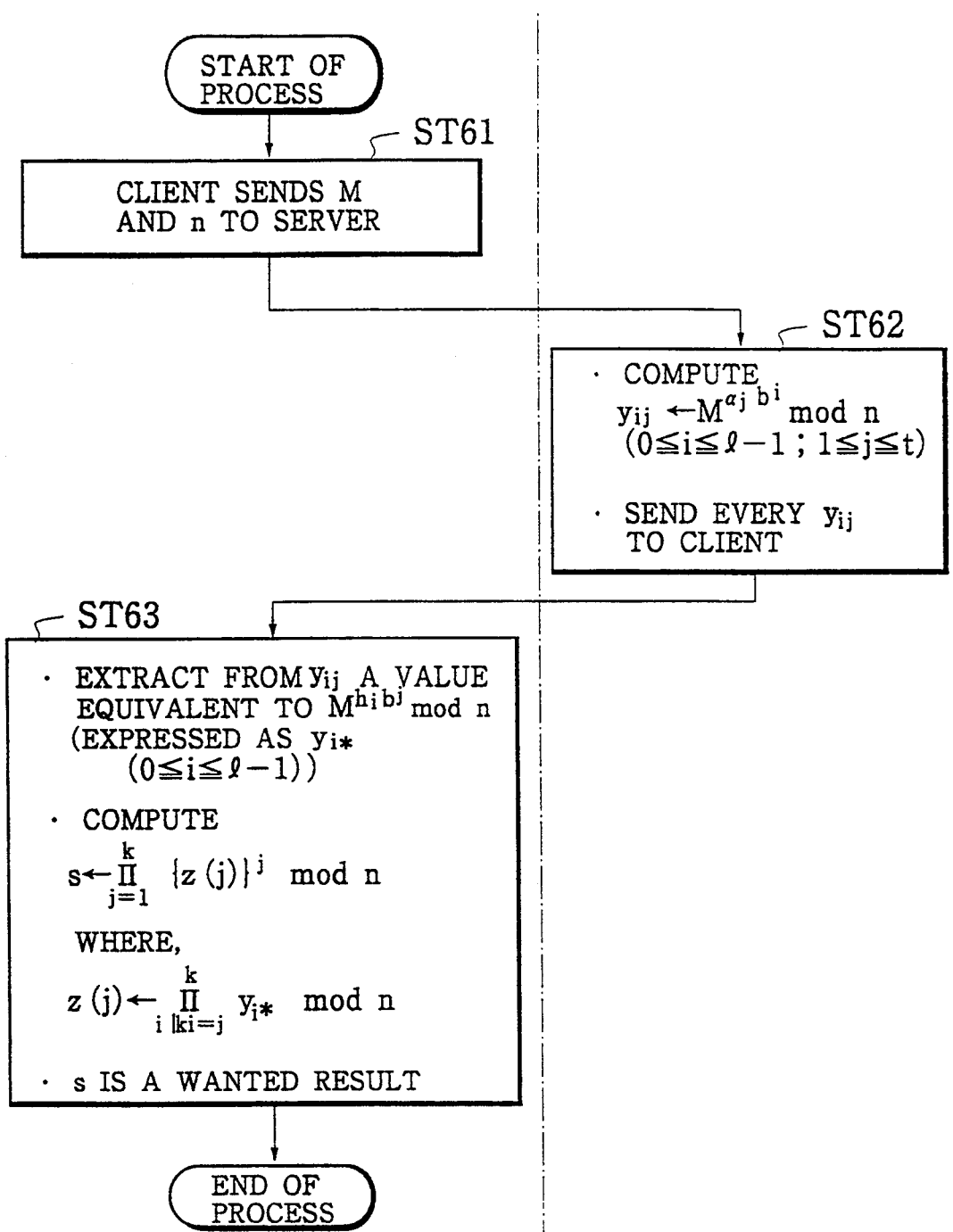
FIG. 10 is a flowchart showing an operation of the sixth embodiment.

With reference to FIG. 10, the sixth embodiment is described using a flowchart therein.

In the sixth embodiment, the exponent d is factored out in the following manner.

$$d = \sum_{j=0}^{l-1} d_j \cdot b^j = \sum_{j=0}^{l-1} (h_j k_j) \cdot b^j,$$

where $j_j$ and $k_j$ are integers such $h_j$ belongs to H={$\alpha_1$, $\alpha_2$, ..., $\alpha_t$} and $0 \leq k_k \leq K$. In other words, $d_j$ is factored out such that $d_j = h_j k_j \mod b$. For example, H and K can be set up as (1) $H = \{1, -1\}$, $K = \lceil(b-1)\rceil 2-$, where $\lceil a \rceil$ is least integer which is greater than or equal to a.

(2) $H = \{1, 31, 1, 2, -2\}$ $K = \lfloor b/3 \rfloor$, where b is an odd number and $\lfloor a \rfloor$ is greatest integer which is smaller than or equal to number a.

Step ST61: The client sends M and n to the server.

Step ST62: For each subscript $i = 0, 1, \ldots, l-1, j = 1, 2, \ldots, t$, compute all $y_{ij}$'s and send results thereof to the client.

$y_{ij} = \{M^{\wedge}(a_j b^i)\} \mod n\}$

Then the client undergoes the following process.

Step ST63: The client selects values of $M - (h_i b^i) \mod n$ $(i=0, 1, 2, \ldots, l-1)$ among $y_{ij}$'s which are successively sent from the server. A selected value is at most one value from $y_{ij}$ which has a same first subscript i, therefore even in total, the selected values are l at most. Let us define $y_{i^*}$ for the selected value having the first subscript i.

Next, compute the following so as to obtain a desired value S.

$$S = \prod_{j=1}^{K} (z(j)^{\wedge}j) \mod n$$

where, $$z(j) = \prod_{i | k_i = j} y_{i^*} \mod n$$

The z(j) is an accumulated result of $y_{i^*}$ for all i's $(i = 0, 1, \ldots, l-1)$ such that $k_i = j$.

For example, the following three steps are executed:

(a): Accumulate to z(j) $(j = 1, 2, \ldots, K)$.

The client sets z(j) to 1 for subscript $j = 1, 2, \ldots, K$, and accumulate to multiply for subscript $i = 0, 1, 2, \ldots, l-1$).

$z(k_i) = \{z(k_i) \cdot y_{i^*}\} \mod n$ (b) The client executes the following computation for subscript $j = K-1, K-2, \ldots, 2, 1$ in this order.

$z(j) = \{z(j) \cdot z(j+1)\} \mod n$ (c) The client repeats the computation of (b).

The value of of memory z(1) is a desired result.

In this sixth embodiment, the amount of computation and communications carried out by the server is greater than that of the first and second embodiments, and is less than that of the third embodiment. Conversely, the number of multiplication performed by the client is less than that in the first and second embodiments and is greater than that in the third embodiment. Thereby, the sixth embodiment is effective in case where the server has a great deal of processing capacity and high-speed communication traffic whereas the processing capacity of the client is far less than that of the server.

EMBODMENT NO. 7

With reference to FIG. 11, the seventh embodiment will be described. In this seventh embodiment, a part of the modular multiplication which is to be executed by the client at step ST63 in the sixth embodiment is executed by the server. The factoring of the exponent is carried out in a similar way as in the sixth embodiment.

Step ST71: Prior to the modular exponentiation operation, the client performs the following precomputation.

Generate K random numbers $r_j$ $(j = 1, 2, \ldots, K)$, where random number rJ is an integer less than n.

Compute R defined as $$R = \prod_{j=1}^{K} (r_j^{\wedge}j) \mod n$$

Then, compute $R^{-1}$ which is a reciprocal such that $(R \cdot R^{-1}) \mod n = 1$, The client can perform the above pre-computation using an idling time of CPU in the client, for example, so that such results can be stored in the memory.

Step ST72: The client sends M and n to the server.

Then, the server executes the following process.

Step ST73: Compute $y_{ij} = \{M^{\wedge}(a_j b_j)\} \mod n$ $(i = 0, 1, \ldots, l-1, j = 1, 2, \ldots, t)$ Send all $y_{ij}$'s to the client.

In transmitting (l.t) data of $y_{ij}$, the order of transmitting such data is regulated such that the data of $y_{ij}$ can be verified at the client side.

Step ST74:

The client extracts a value of $M^{\wedge}(h_i b^i) \mod n$ $(i = 0, 1, \ldots, l-1)$ among $y_{ij}$'s which are successively sent from the server. The extracted value is at most one value from $y_{ij}$ which has a same first subscript i, and even in total, the extracted values are l values at most. Let us define $y_{i^*}$ for the extracted value having the first subscript i.

Set memory z(j) to r, for subscript $j = 1, 2, \ldots, K$, and execute the following modular multiplication for subscript $i = 0, 1, 2, \ldots, l-1$.

$z(k_i) = \{z(k_i) \cdot y_{i^*}\} \mod n$

Send z(j) thus obtained $(j = 1, 2, \ldots, K)$ to the server.

Then, the server executes the following modular computation.

Step ST75: Compute $$w = \prod_{j=1}^{K} (z(j)^{\wedge}j) \mod n$$

Step ST76: The client executes the following computation.

Compute $S = (w \cdot R^{-1}) \mod n$

S is a wanted result.

PERFORMANCE COMPARISON AMONG SEVEN EMBODIMENTS

Next, with reference to FIG. 12, comparison among the first through seventh embodiments in terms of a processing capacity and a memory amount. In the sixth and seventh embodiments, $H = \{1, -1, 2, -2\}$ and $K = \lfloor b/3 \rfloor$. S In a comparison table shown in FIG. 12, the precomputations are defined such that (Pre-computation 1) = ($2^k - 1$ random numbers generated) + (($2^{k+1} - 4$) modular multiplications) + (one reciprocal computation);

(Pre-computation 2) = ($2^{k-1}$ random numbers generated) + ($2^k$ modular multiplications) + (one reciprocal computation);

(Pre-computation 3)=([b/3]random numbers generated)+((2[b/3]−2) modular multiplications)+(one reciprocal computation), where [a] is defined such that [a] is the greatest integer which is smaller than or equal to a.

In FIG. 12, m is a size of the exponent d. Namely, M =[log$_2$ d]+1. In the first through fifth embodiments, k is a block size (bit number) where the binary exponent is divided. In the sixth and seventh embodiments, b is a base to represent the exponent d. l is a digit number of d represented by base b. In other words, l=[log$_b$d]+1. Moreover, in the sixth and seventh, Exp (b) indicates the number of modular multiplications required in the modular computation to the power of b, and Inv indicates a conversion value where the processing time necessary for reciprocal computation is divided by a processing time necessary for one modular multiplication.

In the table of FIG. 12, though the number of multiplications fluctuates slightly in accordance with a bit pattern of d, listed here are the worst values.

With reference to a table shown in FIG. 13, there are shown specific computational amount and memory amount when m=512. In the table, k is set to 5 for simplicity. Assuming that the present invention is employed to a secret transformation in the RSA cryptosystem, m=512 is most often utilized. Though parameters k and b need be chosen to best suit the embodiments, k=5, b=33 are chosen in this table, where Exp(b)=6 and Inv=10 in the sixth and seventh embodiments.

In a comparison table shown in FIG. 13, the precomputations are defined such that (Pre-computation 1)=(31 random numbers generated)+(60 modular multiplications)+(one reciprocal computation); (Pre-computation 2)=(16 random numbers generated)+(32 modular multiplications)+(one reciprocal computation); (Pre-computation 3)=(11 random numbers generated)+(20 modular multiplications)+(one reciprocal computation).

In the above embodiments, the client does not reveal the computational result of C=M$^d$ mod n to other third parties and information on the secret exponent d is only known to the client. However, in the above procedures described so far, the result obtained by the client is not checked whether or not the result is correct, so that the client can do nothing in case where the server interferes the computation in some ways. In such a case, there needs be a way to confirm whether the computational result is correct. Fortunately, in the course of converting the RSA cryptosystem, an inverse conversion on C=M$^d$ mod n can be easily executed by choosing proper parameters. Thus, when an original M is obtained by inverse-converting the resultant C after the server-aided computation, the result can be verified to be correct. The following equation (11) is a specific verification equation.

$$M = C^e \bmod n \quad (11)$$

An important thing here is that equation (11) can be computed with relatively short period of time since exponent e can be set sufficiently small compared to the exponent d.

Now, suppose that the client is the IC card. Then, there can be considered that the computational result C is often outputted to outside of the IC card. In that case, the verification on exponent d plays an effective role in order to have security thereof. However, the efficiency of verification is not 100% against the objective in which information on d is not revealed outside the client. Thus, when the correct result is not obtained after verification, the number of failure is to be memorized by the IC card. Then, the failure occurs more than a specific number, it is preferred to give out a warning to an owner of the IC card. This warning method is preferred to be used together with the verification process.

In summary, by employing the present invention, the modular exponentiation computation can be effectively executed by assigning a part of computation to the server-aided auxiliary device without revealing the secret exponent which is only known to the client.

The application of the present invention is not limited to the RSA signature generation alone. The present invention may be implemented to many other occasions where the exponent is preferred to be held secret except for the client. Other than the RSA signature generation, there can be a key distribution scheme according to Diffie-Hellman to which the present invention can be adapted. Moreover, though the IC card can serve as the specific client, the application of the present invention is not limited to the IC card alone. Besides, the server and the communication line are also not limited to the above embodiments alone.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An auxiliary device aided computation system, comprising:
   a main device including:
      a modular multiplication processing portion so that at least two integers are multiplied and a result thereof is divided by a modulus so as to obtain a residue thereof;
      exponent register means for storing an exponent d;
      memory means for storing a computed result in the processing portion;
   an auxiliary means including:
      a modular multiplication processing portion for performing computation requested by the main device and sending back a result thus obtained therefrom to the main device; and
   communication means for communicating data between the main device and the auxiliary means,
   wherein the auxiliary means performs computing steps independent of the stored exponent d which is recorded only in the main device.

2. A computation system, comprising:
   means for executing modular exponentiation M$^d$ mod n where M and n are integers serving as a predetermined base and modulus, respectively, and d is a predetermined integral exponent which is recorded only in the main device, for storing all factors;
   a main device, having the predetermined integral exponent d which is recorded only in the main device, for storing all factors d$_i$ such that d=Σd$_i$b$^i$ where i is an integer and d$_i$ is an i-th value of d and base b is a positive integer greater than
   at least one auxiliary computation means which depends on M, n and the base b, which executes a plurality of computations by repeating to take a power of b and dividing by n to take the residue thereof and which sends results of the computations thus obtained to the main device, wherein the main device computes a desired modular exponentiation result by utilizing a plurality of computed values which are sent from the auxiliary computation means and factors $d_i$ of exponent d and n.

3. The system of claim 1 or claim 2, wherein the main device further comprises:

random number means for generating a plurality of random numbers while a computation is not executed, computing random number dependent data obtained by a predetermined transformation on the random numbers and for storing the random number dependent data, wherein the auxiliary means executes a predetermined transformation so as to obtain a first transformation value and sends back the first transformation value to the main device, thereafter, the main device introduces the random number into the first transformation value so as to obtain a second transformation value and sends the second transformation value to the auxiliary means, thereafter, the auxiliary means sends to the main device a third transformation value obtained by a predetermined transformation, thereafter, the main device executes a predetermined transformation based on the third transformation value and the random number dependent data so as to obtain an execution result.

4. The device of claim 1, wherein a first set and a second set are defined comprising a plurality of integers responsive to all coefficients $d_i$ expanded by d=$\Sigma d_i b^i$, where d is represented in b base with a positive base b which is greater than 2, and $d_i$'s are congruent to multiplication of an element from the first set and an element from the second set with base b, wherein the main device holds each $d_i$ responsive to respective elements of the first and second sets, wherein the auxiliary means executes a plurality of modular exponentiation computations based on M, modulus n, base b and each element in the second set, and wherein the main device obtains a result of modular exponentiation by a converting operation based on a computed value received from the auxiliary means, n and each element of the first set responsive to the plural coefficients $d_i$'s stored at the main device.

5. A method of computing $C=M^d$ mod n by a main device assisted by an auxiliary computation device, where M and n are positive integers, without revealing d to the auxiliary device, the method comprising the steps of:

$$d = \sum_{j=0}^{l-1} d_j \cdot 2^{kj}$$

where $0 \leq d_j \leq 2^k-1$, $l>1$, l is a least integer greater or equal to m/k where m is a bit number of exponent d, and storing $d_j$ (j=0, 1, 2, ..., 1−1) by the main device;

(b) sending M and n from the main device to the auxiliary device;

(c) computing by the auxiliary device $M^{\wedge}2^{kj}$ mod n for every j=0, 1, 2, . . . m, 1−1 and sending a computational result thereof to the main device; and (d) computing by the main device a desired value $M^d$ from a plurality of the computational results obtained from step (c) and $d_j$ for j=0, 1, 2, ..., 1−1 obtained in step (a).

6. The method of claim 5, wherein step (c) includes the steps of:

(c-1) initializing value $y_o$ as M by the auxiliary device;

(c-2) computing by the auxiliary device the value $y_j$, as $y_{j-1}{}^{\wedge}2^k$ mod n for each subscript j=1, 2, . . . , 1, where $a^{\wedge}b$ designates $a^b$;

(c-3) sending $y_1, y_2, \ldots y_{l-1}$ from the auxiliary device to the main device;

and wherein step (d) includes:

(d-1) initializing memory z(i) as 1 for i=1, 2, ... $2^k-1$;

(d-2) multiplying $y_i$ sent from the auxiliary device to memory $z(_i)$ of the main device;

(d-3) computing by the main device the memory z(i) as z(i).z(i+1) mod n for i=b $2^k-2, 2^k-3, \ldots, 2$, 1 in this order;

(d-4) repeating step (d-3) once more; and (d-5) obtaining a result in z(1).

7. A method of computing $C=M^d$ mod n by a main device assisted by an auxiliary computation device, where M and n are positive integers, without revealing dd to the auxiliary device, the method comprising the steps of:

(a) defining $$d = \sum_{r=1}^{l} u_r \cdot 2^{w(r)}$$

where $1 \leq u_r \leq 2^k-1$, $u_r$ is an odd number, l and w(r) is a positive integer, storing values $u_r$ and w(r) by the main device;

(b) sending M and n from the main device to the auxiliary device;

(c) computing by the auxiliary device $M^{\wedge}2^j$ mod n for j=0, 1, 2, ..., m where m is a size of exponent d expressed by a binary system, and sending a computational result thereof to the main device; and (d) computing by the main device a desired value $M^d$ from a plurality of the computational results obtained above, $u_r$ and w(r) for r=1, 2, ..., l obtained in step (a).

8. The method of claim 7, wherein step (c) includes the steps of:

c-1) initializing the value of $y_o$ as M by the auxiliary device;

(c-2) computing by the auxiliary device the value $y_j$ as $y_{j-1}{}^{\wedge}2$ mod n for each subscript j=1, 2, . . . , m, and sending $y_1, y_2, \ldots, y_m$ from the auxiliary device to the main device; and wherein step (d) includes the steps of:

(d-1) initializing memory z(i) as 1 for i=1, 2, ..., $2^{(k-1)}$;

(d-2) multiplying $y_{w(r)}$ sent from the auxiliary device to memory $z((u_r+1)/2)$ of the main device, for r=1, 2, ..., l;

(d-3) computing by the main device the memory z(i) as z(i).z(i+1) mod n for i=$2^{(k-1)}-1$, $2^{(k-1)}-2$, .., 2, 1 in this order;

(d-4) repeating step (d-3) for i=$2^{(k-1)}-1$, $2^{(k-1)}-2$, ..., 2 in this order; and (d-5) computing $\{z(1).(z(2))^z\}$ mod n.

9. The method of claim 5, further comprising a pre-computation which is performed during an idling time of The main device and prior to a modular exponentiation, the pre-computation comprising the steps of:

(i) generating ($2^j-1$) random numbers $r_i$ by the main device, where k is a positive integer and i=1, 2, ..., $2^k-1$;

(ii) computing $$R = \left( \prod_{i=1}^{2^k-1} r_i{}^{\wedge}i \right) \bmod n; \text{ and}$$

(iii) computing $R^{-1}$ which is a reciprocal such that $(R.R^{-1}) \bmod n=1$, whereby the above computations results are introduced to a modular exponentiation computation at a later step.

10. The method of claim 7, further comprising a pre-computation which is performed during an idling time of the main device and prior to a modular exponentiation, the pre-computation comprising the steps of:

(i) generating ($2^{\wedge}(k-1)$) random numbers $r_i$ by the main device for i=1, 2, ..., $2^{k-1}$;

(ii) computing $$R = \left( \prod_{i=1}^{2^{\wedge}(k-1)} r_i{}^{\wedge} (2i - 1) \right) \bmod n; \text{ and}$$

(iii) computing $R^{-1}$ which is a reciprocal such that $(R.R^{-1}) \bmod n=1$, whereby the above computational results are introduced to a modular exponentiation computation at a later stage.

11. The method of any one of claim 5, claim 7, claim 8, claim 9 or claim 10, further comprising the steps of dividing modulus n into two primes and performing the Chinese remainder theorem thereupon so as to reduce computation time therefor.

12. The method of any claim 6, claim 7, claim 8, claim 9, or claim 10, wherein conversion on $C=M^d \bmod n$ is executed by choosing proper parameters so as to verify a result obtained from the server.

* * * * *